United States Patent Office 3,723,364
Patented Mar. 27, 1973

3,723,364
COPOLYMER FOAMS CONTAINING ISOCYANURATE, CARBODIIMIDE AND EITHER AMIDE OR IMIDE LINKAGES
Alexander McLaughlin, Meriden, Herbert G. Nadeau, North Haven, and James S. Rose, Guilford, Conn., assignors to The Upjohn Company, Kalamazoo, Mich.
No Drawing. Filed Mar. 1, 1971, Ser. No. 119,896
Int. Cl. C08g 20/20, 20/32, 20/38
U.S. Cl. 260—2.5 AC                               11 Claims

ABSTRACT OF THE DISCLOSURE

The friability of polymer foams in which the major recurring units are a combination of isocyanurate and either amide or imide or both, is markedly reduced by introducing a minor proportion of carbodiimide linkages into the polymer. This is accomplished by incorporating a carbodiimide-forming catalyst (e.g. a phospholene oxide) into the polymer foam forming reaction mixtures employed to prepare the above type of foam. The resulting foams are highly useful, heat resistant, thermally insulating materials.

BACKGROUND OF THE INVENTION

Field of the invention

This invention relates to the preparation of polymer foams and to the foams so prepared and is more particularly concerned with polyimide-polyamide-polyisocyanurate copolymer foams having improved friability and with the foams so prepared.

Description of the prior art

Polymer foams having high resistance to deformation by heat as well as excellent thermal insulating capacity have been shown to be obtained by reacting an organic polyisocyanate and a polycarboxylic compound in the presence of a trimerization catalyst under foam producing conditions. The resulting polymer foam is a copolymer in which the characteristic recurring units are isocyanurate moieties derived by trimerization of the polyisocyanate and amide or imide moieties, or both, derived by interaction of the isocyanate and the free carboxylic and/or anhydride groups in the polycarboxylic compound. Such foams, and methods for their preparation are described at length in copending application Ser. No. 794,367, filed Jan. 27, 1969, now U.S. 3,644,234 by Robin L. Grieve, the disclosure of which, in its entirety, is incorporated herein by reference.

The above type of polymer foams suffer the disadvantage of comparatively high friability. We have now found that said friability can be remarkably reduced without any significant effect on the other highly desirable properties of said foams in a simple but elegant manner which will be described hereafter.

SUMMARY OF THE INVENTION

This invention comprises a polymer foam which is characterized by high resistance to deformation on exposure to heat, by low friability, and by the presence therein of a combination of (i) isocyanurate moieties, (ii) amide or imide moieties or both, and (iii) carbodiimide moieties, said foam being the product of reaction, in the presence of a blowing agent, of (a) an organic polyisocyanate;
(b) from about 0.06 equivalent to about 0.6 equivalent, per equivalent of polyisocyanate, of a polycarboxylic acid compound containing at least two carboxylic moieties selected from the class consisting of free carboxylic acid groups and anhydride groups;

said reaction having been carried out in the presence of catalytic amount of a homocyclic polyepoxide, a trimerization catalyst, a catalyst for the reaction of an isocyanate and anhydride group and a catalyst for the conversion of isocyanate to carbodiimide.

The polymer foams of the invention can be employed for all purposes for which the commercially available polymer foams are currently employed; for example, as thermal barriers and as insulating materials in a wide variety of applications.

DETAILED DESCRIPTION OF THE INVENTION

The organic polyisocyanate, polycarboxylic compound, trimerization and isocyanate-anhydride catalysts employed in preparing the polymer foams of the invention can be any of those described and exemplified in the aforesaid application Ser. No. 794,367. Thus, the organic polyisocyanate can be any of those known in the art of preparing polymer foams from isocyanates. Preferably, said polyisocyanate is methylenebis(phenyl isocyanate), including the 4,4'-isomer, the 2,4'-isomer and mixtures thereof, modified forms of methylenebis(phenyl isocyanate) such as those described in U.S. Pats. 3,384,653 and 3,449,256, and mixtures of polymethylene polyphenyl polyisocyanates such as those containing from about 35 to about 85 percent by methylenebis(phenyl isocyanate). The latter are prepared by phosgenation of the corresponding mixtures of polyamines as is well recognized in the art; see, for example, U.S. 2,683,730; 2,950,263; 3,012,008; and 3,097,191.

The polycarboxylic compound employed in the process of the invention contains at least two carboxylic moieties selected from the class consisting of free carboxy groups and anhydride groups. Said polycarboxylic derivatives are inclusive of aromatic, aliphatic, cycloaliphatic, or heterocyclic polycarboxylic acids as well as the intramolecular and/or intermolecular anhydrides thereof, provided that, in the case of those anhydrides which contain a single anhydride group, there is also present in the molecule at least one free carboxy group. As will be appreciated by one skilled in the art, only those polycarboxylic acids which contain carboxy groups attached either to two adjacent carbon atoms or to two carbon atoms which are separated from each other by a single carbon or hetero-atom are capable of forming intra- as opposed to inter-molecular acid anhydrides.

Any polycarboxylic compound meeting the above requirements can be employed in the preparation of the polymer foams of the invention; many illustrative examples of such polycarboxylic compounds are described in the aforesaid application Ser. No. 794,367, and are, accordingly, not reproduced herein for the sake of brevity but are incorporated by reference. As will be apparent to the skilled chemist, the nature of the recurring units in the resulting polymers will vary according to the structure of the starting polycarboxylic compound. When the polycarboxylic compound is a dicarboxylic acid which is incapable of forming an intramolecular anhydride, the product formed in accordance with the invention will contain, as one of the major characterising units, the amide moiety, i.e. the product derived by interaction of said dicarboxylic acid and a diisocyanate would contain the recurring unit:

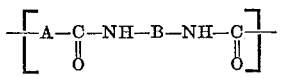

wherein A is the hydrocarbon residue of the dicarboxylic acid starting material and B is the hydrocarbon residue of the diisocyanate. On the other hand, when the polycarboxylic compound is an intramolecular or intermolecular anhydride which contains two or more anhydride moieties or contains one anhydride moiety and free carboxylic acid groups capable of intramolecular or intermolecular anhydride formation, the product of reaction in accordance with the invention will contain imide moieties as a characteristic recurring unit, i.e. the product of reaction of a diisocyanate and a polycarboxylic compound containing two intramolecular anhydride groups would contain the recurring unit:

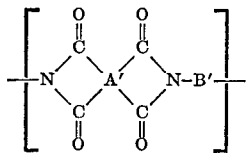

wherein A' is the hydrocarbon residue of the dianhydride and B' is the hydrocarbon residue of the diisocyanate.

Similarly, where the polycarboxylic compound contains one or more anhydride groups in addition to a free carboxylic acid group or groups, the polymer which is obtained in accordance with the invention will be essentially a hybrid containing both amide and imide linkages.

The homocyclic polyepoxides which are employed in the preparation of the polymer foams of the invention are a well-known class of compounds characterized by the presence in the molecule of at least two epoxy groups each of which is present in a substituent attached to a cyclic hydrocarbon or fused to a non-aromatic ring in a cyclic hydrocarbon compound. Such epoxides are described and exemplified at some length in the aforesaid copending application Ser. No. 794,367, and, accordingly, are not reproduced herein for the sake of brevity but are incorporated by reference. The preferred homocyclic epoxides for use in the preparation of polymer foams of the invention are the glycidyl ethers of non-fused polynuclear phenols, the glycidyl ethers of novolac resins and the glycidyl ethers of primary aromatic amines such as methylenedianiline and polymethylene polyphenyl polyamines which contain methylenedianiline as the major component thereof.

The trimerization catalysts which are employed in the preparation of the polymer foams of the invention can be any of the catalysts known in the art which, either alone or in combination with the homocyclic polyepoxides, cause trimerization of the organic polyisocyanate; see, for example, U.S. Pat. 3,516,950, at Column 3, lines 13 to 46. The preferred trimerization catalysts for use in preparing the polymer of the invention are the N,N',N''-tris(dialkylaminoalkyl)hexahydrotriazines, the mono(dialkylaminoalkyl)phenols, and the 2,4,6-tris(dialkylaminoalkyl)phenols of which many illustrative examples are given in aforesaid copending application Ser. No. 794,367. These preferred trimerization catalysts can be employed singly or in combination of two or more such amines. A particularly preferred trimerization catalyst to be used in accordance with the invention, is N,N',N''-tris(dimethylaminopropyl)-s-hexahydrotriazine.

In addition to the use of the trimerization catalyst, alone or in combination with the homocyclic polyepoxide, in making the polymer foams of the invention, there can be employed a lower-alkanol in an amount of about 0.02 to about 0.1 equivalent per equivalent of polyisocyanate. By lower-alkanol is meant a saturated aliphatic monohydric alcohol containing from 1 to 6 carbon atoms, inclusive, such as methanol, ethanol, isopropyl alcohol, 2-butanol, pentyl alcohol, 3-hexanol and the like. The preferred lower-alkanol for use in preparing the polymer foams of the invention is methanol. Said lower-alkanol, when employed, can be added to the reaction mixture as a separate component but is preferably pre-blended with the tertiary amine and the resulting blend is added to the foam reaction mixture as a single component.

The imide-forming catalysts employed in the process of the invention, i.e. the catalysts for the reaction of isocyanato and anhydride groups to form the corresponding imides, can be any of those known in the art; see, for example, the catalysts named by Farrissey et al., Journal Applied Polymer Science, 14, 1093, 1970. Such known catalysts include triethylenediamine, triethylamine and like trialkylamines, water, lead naphthenate, the ferrous complex of 2,4-pentanedione, the ferric complex of 2,4-pentanedione, the manganese complex of 2,4-pentanedione and the like. The preferred imide-forming catalysts for use in accordance with the invention are triethylenediamine, triethylamine, and water (which latter may also act as blowing agent as discussed hereafter). The most preferred imide-forming catalyst for use in accordance with the invention is triethylenediamine.

The carbodiimide catalysts employed in accordance with the invention can be any of those known in the art as being useful in the conversion of an isocyanate to the corresponding carbodiimide. Illustrative of such catalysts are:

(a) Phospholene 1-oxides and 1-sulfides having the formulae:

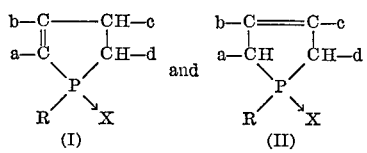

wherein a, b, c, and d are each selected from the group consisting of hydrogen and hydrocarbyl from 1 to 12 carbon atoms, inclusive, R is selected from the group consisting of lower-alkyl and aryl, and X is selected from the group consisting of oxygen and sulfur.

The above 2-phospholene compounds (I) and methods for their preparation are described in U.S. Pats. 2,663,737; 2,663,738; and 2,853,473. These latter patents show the phospholene compounds as having the double bond in the 3-position, i.e. having Formula II. However, it has now been established that the compounds produced in accordance with the processes disclosed in the patents have the double bond in the 2-position, i.e. have the Formula I. The corresponding compounds having the Formula II can, however, be prepared using procedures known in the art; see, for example, Quin et al., Journal American Chemical Society, 33, 1034, 1968. The 3-phospholenes (II) can be isomerized readily to the corresponding 2-phospholenes (I) by thermal treatment or by refluxing with an aqueous base as disclosed by Quin et al., supra. Representative compounds within the above class are 1-phenyl-2-phospholene 1-oxide; 3-methyl-1-phenyl-2-phospholene 1-oxide; 1-phenyl-2-phospholene 1-sulfide; 1-ethyl - 2 - phospholene 1-oxide; 1-ethyl-3-methyl-2-phospholene 1-oxide; 1-ethyl-3-methyl-2-phospholene 1-sulfide and the isomeric 3-phospholenes corresponding to the above-named compounds.

(b) Diaza- and oxaza-phospholanes and -phosphorinanes of the formula:

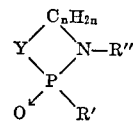

wherein $C_nH_{2n}$ represents alkylene from 1 to 12 carbon atoms, inclusive, at least one and not more than three adjacent carbon atoms in said alkylene radical forming a chain one end of which is attached to Y and the other end of which is attached to N thereby completing the heterocyclic ring; R' is selected from the group consisting of hydrocarbyl containing from 1 to 12 carbon atoms; inclusive, and halo-, nitro-, alkoxy-, alkyl-, mercapto-, and cyano-substituted hydrocarbyl from 1 to 12 carbon atoms, inclusive, R'' is hydrocarbyl from 1 to 12 carbon atoms, inclusive, and Y is selected from the group consisting of —O— and —NR''— wherein R'' has the significance above defined.

The above compounds and methods for their preparation are described in U.S. Pat. 3,522,303. Representative examples of such compounds are:

2-ethyl-1,3-dimethyl-1,3,2-diazaphospholane 2-oxide,
2-chloromethyl-1,3-dimethyl-1,3,2-diazaphospholane 2-oxide,
2-trichloromethyl-1,3-dimethyl-1,3-2-diazaphospholane 2-oxide,
2-phenyl-1,3-dimethyl-1,3,2-diazaphospholane 2-oxide,
2-phenyl-1,3-dimethyl-1,3,2-diazaphosphorinane 2-oxide,
2-benzyl-1,3-dimethyl-1,3,2-diazaphospholane 2-oxide,
2-allyl-1,3-dimethyl-1,3,2-diazaphospholane 2-oxide,
2-bromomethyl-1,3-dimethyl-1,3,2-diazaphospholane 2-oxide,
2-cyclohexyl-1,3-dimethyl-1,3,2-diazaphospholane 2-oxide,
2-(2-ethoxyethyl)-1,3-dimethyl-1,3,2-diazaphospholane 2-oxide, and
2-naphthyl-1,3-dimethyl-1,3,2-diazaphospholane 2-oxide.

(c) Triarylarsines wherein the aryl groups are free from substituents containing reactive hydrogen atoms, said arsines being represented by the formula:

wherein each of R, $R_1$, and $R_2$ represent the same or a different aryl moiety having from 6 to 12 carbon atoms, inclusive. Such compounds are described in U.S. Pat. 3,406,198. Representatives examples are triphenylarsine,
tris(p-tolyl)-arsine,
tris(p-methoxyphenyl)arsine,
tris(p-ethoxyphenyl)arsine,
tris(p-chlorophenyl)arsine,
tris(p-fluorophenyl)arsine,
tris(2,5-xylyl)arsine,
tris(p-cyanophenyl)arsine,
tris(1-naphthyl)arsine,
tris(p-methylmercaptophenyl)arsine,
tris(p-biphenylyl)arsine,
p-chlorophenyl bis(p-tolyl)-arsine and
phenyl(p-chlorophenyl)(p-bromophenyl)arsine.

(d) Metallic derivatives of acetylacetone such as the beryllium, aluminum, zirconium, chromium, and iron derivatives thereof as disclosed in U.S. Pat. 3,152,131.

(e) Phosphate esters of the formulae $(RO)_3PO$ wherein R is hydrocarbyl from 1 to 12 carbon atoms inclusive. Such esters and methods for their preparation are disclosed in U.S. Pat. 3,056,835. Representative examples are trimethylphosphate, triethylphosphate, ethyldipropylphosphate, triisopropylphosphate, triallylphosphate, triphenylphosphate, and tricresylphosphate.

(f) Metal complexes derived from a d-group transition element and a π-bonding ligand selected from the group consisting of carbon monoxide, nitric oxide, hydrocarbyl isocyanides, trihydrocarbyl phosphine, trihydrocarbylarsine, trihydrocarbylstibine, and dihydrocarbyl sulfide, wherein hydrocarbyl in each instance contains from 1 to 12 carbon atoms, inclusive, provided that at least one of the π-bonding ligands in the complex is carbon monoxide or hydrocarbyl isocyanide. Such complexes and methods for their preparation are disclosed in U.S. Pat. 3,406,197. Representative examples of such complexes are iron pentacarbonyl diiron ennacarbonyl tungsten hexacarbonyl molybdenum hexacarbonyl, chromium, hexacarbonyl, dimanganese decacarbonyl, nickel tetracarbonyl, ruthenium pentacarbonyl, and the complex of iron tetracarbonyl: methylisocyanide.

The term "hydrocarbyl from 1 to 12 carbon atoms, inclusive" employed herein means the monovalent radical obtained by removing one hydrogen atom from the parent hydrocarbon having the stated carbon atoms content. Illustrative of such groups are alkyl such as methyl, ethyl, propyl, butyl, pentyl, hexyl, heptyl, octyl, nonyl, decyl, undecyl, and dodecyl including isomeric forms thereof; alkenyl such as allyl, butenyl, pentenyl, hexenyl, heptenyl, octenyl, nonenyl, decenyl, undecenyl, and dodecenyl, including isomeric forms thereof; cycloalkyl such as cyclobutyl, cyclopentyl, cyclohexyl, cycloheptyl, cyclooctyl and the like; cycloalkenyl such as cyclopentenyl, cyclohexenyl, cycloheptenyl and the like; aralkyl such as benzyl, phenethyl, phenylpropyl, benzhydryl, naphthylmethyl and the like; and aryl such as phenyl, tolyl, xylyl, naphthyl, biphenylyl and the like.

The term "lower-alkyl" as used herein means alkyl from 1 to 6 carbon atoms, inclusive, such as methyl, ethyl, propyl, butyl, pentyl, hexyl and isomeric forms thereof.

The term "alkylene from 1 to 12 carbon atoms, inclusive, at least one and not more than three adjacent carbon atoms in said alkylene radical forming a chain" means methylene, ethylene and trimethylene one or more of the hydrogen atoms of which divalent radicals can be replaced by alkyl groups such as methyl, ethyl, propyl, butyl, pentyl, hexyl and isomeric forms thereof, provided that the total number of carbon atoms in the alkylene group does not exceed the stated limit.

The term "alkoxy" as used herein means alkoxy from 1 to 6 carbon atoms, inclusive, such as methoxy, ethoxy, propoxy, butoxy, pentyloxy, hexyloxy and isomeric forms thereof. The term "alkylmercapto" as used herein means methylmercapto, ethylmercapto, propylmercapto, butylmercapto, pentylmercapto, hexylmercapto and isomeric forms thereof.

The preferred carbodiimide catalysts for use in preparing polymer foams in accordance with the invention are the 2-phospholenes shown in Formula (I) under (a) above. The most preferred carbodiimide catalysts for use in preparing polymer foams in accordance with the invention are the 1-aryl-3-lower-alkyl-2-phospholene 1-oxides and the 1,3-di(lower-alkyl)-2-phospholene 1-oxides. The most preferred species are 1 - phenyl-3-methyl-2-phospholene - 1-oxide and 1-ethyl-3-methyl-2-phospholene-1-oxide.

In preparing the polymer foams in accordance with the invention, the polyisocyanate and polycarboxylic compound are brought together in a one-shot procedure in the presence of the homocyclic polyepoxide, the tertiary amine and the carbodiimide catalysts. The admixture can be accomplished manually or by use of any of the mechanical mixing heads conventionally employed in the mixing and dispensing of polymer foam reaction mixes. Generally speaking, it is not necessary to supply any external heat to the reactants before or after they have been brought together particularly in the instances where a lower alkanol, as above defined, is included in the reaction mixture. Accordingly, this means that the polymer foams can be utilized for all purposes, including pouring-in-place in cavity walls and the like, for which polyurethane and like insulating foams are employed in the art. Their use is not restricted, as is the case with many polyimide foams of the prior art, by the necessity to supply substantial amounts of external heat in order to complete the polymer formation.

In carrying out the process of the invention, no special techniques are required. The various components are simply brought together using agitation means sufficient to ensure homogeneity in the resulting mixture. Advantageously, the polyisocyanate and polycarboxylic compound are mixed together in a preliminary step and the catalyst combination is admixed therewith with vigorous agitation, either manual or mechanical. Immediately after mixing is complete, the foam reaction mix is poured or dispensed directly into the appropriate mold and foaming is allowed to take place in accordance with procedures well-recognized in the art for the molding of polymer foams.

The condensation of the polyisocyanate and the polycarboxylic compound in accordance with the invention results in the elimination of carbon dioxide. This evolved carbon dioxide behaves as an in situ blowing agent resulting in the formation of comparatively low density (from about 1.6 p.c.f. to about 3.7 p.c.f. depending on the proportions of polycarboxylic compound employed) polymer foams. If lower density foams are required other extraneously added blowing agents can be employed in appropriate amounts. Illustrative of said extraneous blowing agent are water (which generates carbon dioxide by reaction with isocyanate) and volatile solvents such as the lower molecular weight aliphatic hydrocarbons, namely, those having boiling points from about −40° C. to about 200° C., preferably from about −20° C. to about 115° C., for example, difluorochloromethane, trichloromonofluoromethane, dichlorodifluoromethane, chlorotrifluoromethane, 1,1-dichloro-1-fluoroethane, 1-chloro-1,1-difluoro-2,2-dichloroethane, 1,1,1-tribromo-2-chloro-2-fluorobutane and the like. If desired, a mixture of water and one or more of said volatile solvents can be used as the extraneous blowing agent.

The relative molar proportions of polyisocyanate and polycarboxylic compound employed in preparing the polymer foams of the invention is always such that there is an excess of isocyanate over the amount necessary for reaction with all the carboxy and/or anhydride groups present in the polycarboxylic compound. Advantageously, the proportions of polyisocyanate and polycarboxylic compound are such that there are from about 0.06 equivalent to about 0.6 equivalent of polycarboxylic compound per equivalent of polyisocyanate. Preferably, there is employed from about 0.2 equivalent to about 0.4 equivalent of polycarboxylic compound per equivalent of polyisocyanate. The term "equivalent" when employed in reference to the polycarboxylic compound corresponds to the molecular weight of said compound divided by the total number of free carboxylic acid groups and/or anhydride groups in said compound.

The homocyclic polyepoxide, the trimerization catalyst, and the imide-forming catalyst employed in the polymer foams of the invention are present in catalytic amounts in the polymer foam reaction mixture, i.e. the amount of each of these components is less thane one mole per mole of polyisocyanate. Advantageously, the amount of polyepoxide employed is from about 0.01 mole to about 0.3 mole per mole of polyisocyanate and preferably is from about 0.10 mole to about 0.20 mole per mole of polyisocyanate. The proportion of trimerization catalyst employed in the catalyst system is advantageously from about 0.01 mole to about 0.05 mole per mole of polyisocyanate and, preferably, is from about 0.02 mole to about 0.04 mole per mole of isocyanate. The proportion of imide-forming catalyst employed in the process of the invention is advantageously from about 0.03 mole to about 0.15 mole, per mole of polyisocyanate and preferably from about 0.05 mole to about 0.12 mole, per mole of polyisocyanate.

The proportion of lower alkanol, if present, in the reaction is advantageously within the range of about 0.02 hydroxyl equivalent to about 0.1 hydroxyl equivalent per equivalent of polyisocyanate and, preferably, within the range of about 0.03 hydroxyl equivalent to about 0.05 hydroxyl equivalent per equivalent of polyisocyanate.

The amount of carbodiimide-forming catalyst present in the polymer foam reaction mixture in accordance with the invention varies depending upon the relative activity of said catalyst and the proportion of carbodiimide linkages which it is desired to have present in the final polymer foam. Advantageously, the amount of carbodiimide catalyst employed is within the range of about 0.002 mole to about 0.012 mole per mole of polyisocyanate and, preferably, is within the range of about 0.004 mole to about 0.006 mole per mole of polyisocyanate.

Optional additives such as dispersing agents, cell stabilizers, surfactants, flame retardants and the like which are commonly employed in the fabrication of polymer foams, can be employed in preparing the polymer foams of the invention. Organosilicone polymers obtained by condensing a polyalkoxy polysilane with the monoether of a polyalkylene glycol in the presence of an acid catalyst are representative of the surfactants which can be used. Other surfactants such as ethylene oxide modified sorbitan monopalmitate or ethylene oxide modified polypropylene-ether glycol may be used, if desired, to obtain better dispersion of the components of the foam mixture.

Additives such as dyes, pigments, soaps and metallic powders and other inert fillers may be added to the foam mixture to obtain special foam properties in accordance with practices well-known in the art.

The foam polymers of this invention possess the same outstanding high temperature and flame resistant properties as the compounds described in the aforesaid copending application Ser. No. 794,367. However, the polymer foams of the invention possess the additional advantage of having remarkably reduced friability.

The cellular polymers of the invention have decomposition temperatures in excess of 500° C. as measured by thermal gravimetric analysis (TGA) and very low flame spread ratings as measured by a modified ASTM E 84–61. It is to be noted that these high temperature resistant properties and low flame spread ratings have been achieved in the cellular polymers of the invention without recourse to the flame retardants which have hitherto been incorporated into cellular polymers to achieve flame retardant properties. The introduction of such flame retardants is highly undesirable because they tend to reduce the structural strength and like properties of the foam. Accordingly, the process and compositions of the invention represent a unique advance in foam technology. In particular the invention provides cellular polymers based on polyisocyanates which have sufficiently low flame spread ratings, as measured by the ASTM E 84–61 flame test, to permit the use of such polymers in the construction of domestic and industrial buildings.

The cellular products of the invention can be employed for all the purposes for which the currently produced commercial cellular products are conventionally employed. For example, the cellular products of the invention can be employed as thermal barriers in the construction of fire walls in the building of industrial and institutional structures (e.g. schools, hospitals etc.) and as insulating materials for high temperature pipe lines and ovens, in supersonic aircraft and also as missile components. As previously pointed out, the novel process of the invention enables cellular products of the above type to be poured-in-place and thereby provides a very significant advantage over previous methods described for the preparation of polyimide and like foams. Thus, the process of the invention does not require the application of external heat in order to effect the polymer formation nor does it require the heating of molds, cavity walls and the like, to high temperatures.

The following examples describe the manner and process of making and using the invention and set forth the best mode contemplated by the inventors of carrying out the invention but are not to be construed as limiting.

EXAMPLE 1

Two foams were prepared from the reactants and proportions (all parts by weight) set forth in Table I below. The procedure adopted was the same in both cases, the only significant difference being the use of the carbodiimide catalyst, 1-phenyl-3-methyl-2-phospholene-1-oxide, in Foam A. The polyisocyanate, the dianhydride, the epoxide, and the surfactant were blended together mechanically to form one component of the reaction mixture. The remaining components were blended mechanically in a separate operation o form the second component of the reaction mixture. The two components, each at a temperature of 20–25° C., were then blended in a 1 quart paper cup with high speed stirring for a period of 15 to 20 seconds before being allowed to foam. The resulting foam was cured for 4 days at circa 25° C. before being submitted to physical testing. The results of physical tests on the two foams are set forth in Table I. It will be seen that the friability of Foam A, prepared by incorporation of the carbodiimide catalyst, was significantly lower than that of Foam B, prepared under substantially the same conditions but in the absence of the carbodiimide forming catalyst. The higher density of Foam B compared with Foam A is attributable to the difference in the level of methanol and tertiary amine in the reaction mixtures and to the carbon dioxide evolved in carbodiimide formation in Foam A.

TABLE I

| | Foam A | Foam B |
|---|---|---|
| Reaction components: | | |
| Polymethylene polyphenyl polyisocyanate (PAPI®: eq. wt.=133) | 134 | 134 |
| 3,3',4,4'-benzophenone tetracarboxylic dianhydride (BTDA) | 45 | 45 |
| Epoxy novolac resin [1] | 20 | 20 |
| Organosilicone surfactant [2] | 1 | 1 |
| Methyl alcohol | 2.5 | 2 |
| N,N',N''-tris(dimethylaminopropyl)-s-hexahydrotriazine | 2.5 | 2 |
| Triethylenediamine | 2.5 | 2 |
| 1-phenyl-3-methyl-2-phospholene-1-oxide | 2.5 | |
| Properties: | | |
| Density, p.c.f. | 1.98 | 3.72 |
| Closed Cell, percent | 96.9 | 62.5 |
| Compressive strength, p.s.i., // to rise (ASTM D 1621–64) | 26.4 | 15.6 |
| Percent volume change: | | |
| At 158° F., 100% relative humidity: | | |
| after 1 day | 2.44 | 0.60 |
| after 3 days | 2.87 | 0.93 |
| after 7 days | 2.71 | 0.80 |
| At 200° F., ambient humidity: | | |
| after 3 days | −0.16 | −0.79 |
| after 7 days | −0.60 | −0.96 |
| Flame test: | | |
| Modified [3] ASTM E 84-61 Tunnel Test: | | |
| Flame spread rating | 40 | 34 |
| Smoke density rating | 12 | 22 |
| Friability (ASTM C 421-61): Percent weight loss after 10 minutes | 27.4 | 39.4 |

[1] DEN 431: Equivalent weight=172–179 Dow.
[2] DC-193: Dow Corning.
[3] Modification consists in using combustion chamber of reduced scale but otherwise proceeding in accordance with the ASTM test. The values obtained in the modified test are approximately twice as high as those in the Official test; e.g. material rated 25 in the Official test has a rating of 52 in the modified test.

EXAMPLE 2

Using the procedure described in Example 1 there were prepared a series of five foams employing the reactants and proportions set forth in Table II below. The physical properties of these foams were measured after aging for 4 days at circa 25° C. and the results are recorded in Table II. The same tests were used as are identified in Example 1. It will be seen that each of the foams had low friability of such an order that the foams were readily acceptable for commercial usage.

TABLE II

| | C | D | E | F | G |
|---|---|---|---|---|---|
| Reaction components: | | | | | |
| Polymethylene polyphenyl polyisocyanate (PAPI®) | 134 | 134 | 134 | 134 | 134 |
| BTDA | 45 | 45 | 45 | 45 | 45 |
| Epoxy novolac resin [1] | 20 | 20 | 20 | 20 | 20 |
| Organosilicone sufractant [2] | 1 | 1 | 1 | 1 | 1 |
| N,N',N''-tris(dimethylaminopropyl)-s-hexahydrotriazine | 3 | 3 | 4 | 3 | 3 |
| Methyl alcohol | 3 | 3 | 4 | 3 | 3 |
| Triethylene diamine | 3 | 3 | 2 | 3 | 3 |
| 1-phenyl-3-methyl-2-phospholene-1-oxide | 3 | 1 | 4 | 1 | 3 |
| Properties: | | | | | |
| Density, p.c.f. | 1.99 | 2.49 | 2.6 | 2.1 | 2.3 |
| Smoke density rating | 8.2 | 5.0 | | | 6.6 |
| Friability: percent weight loss after 10 minutes | 16.3 | 16.8 | 5.0 | 12.4 | 16.9 |

[1] DEN 431: see Example 1.
[2] DC-193: see Example 1.

EXAMPLE 3

Using the procedure described in Example 1, but employing the reactants and proportions (all parts by weight) set forth in Table III below, there were prepared three foams in accordance with the invention. The physical properties of these foams are recorded in Table III and were determined after aging said foam for 4 days at circa 25° C. using the same tests as are identified in Example 1.

TABLE III

| | Foam H | Foam I | Foam J |
|---|---|---|---|
| Reaction components: | | | |
| Polymethylene polyphenyl polyisocyanate (PAPI®) | 134 | 134 | 134 |
| BTDA | 45 | 45 | 45 |
| Epoxy novolac resin [1] | 20 | 20 | 20 |
| Organozilicone surfactant | 1 | 1 | 1 |
| Methyl alcohol | 3 | 2.5 | 2 |
| N,N',N''-tris(dimethylaminopropyl)-s-hexahydrotriazine | 3 | 2.5 | 2 |
| Triethylenediamine | 3 | 2.5 | 2 |
| 1-phenyl-3-methyl-2-phospholene-1-oxide | 3 | 2.5 | 2 |
| Properties: | | | |
| Density, p.c.f. | 2.10 | 1.90 | 1.78 |
| Closed cell content | 94 | 96.9 | 97.7 |
| Flame spread rating | 35 | 36 | 34 |
| Smoke density rating | 10 | 8 | 7 |
| Friability: percent weight loss after 10 minutes | 14.1 | 26.9 | 29.2 |

[1] DEN 431: See Example 1.

What is claimed is:

1. A polymer foam characterized by high resistance to deformation by heat, low friability, and by the presence of isocyanurate moieties, carbodiimide moieties and moieties selected from the class consisting of amide and imide, said foam being the product of reaction at ambient temperature, without preheating of components, in the presence of a blowing agent of:
   (a) an organic polyisocyanate,
   (b) from about 0.06 equivalent to about 0.6 equivalent, per equivalent of polyisocyanate, of a polycarboxylic acid derivative containing at least two carboxylic moieties selected from the class consisting of free carboxylic acid groups and anhydride groups, said reaction being carried out in the presence of from about 0.01 mole to about 0.3 mole of a homocyclic polyepoxide per mole of polyisocyanate, from about 0.01 mole to about 0.05 mole, per mole of polyisocyanate, of a trimerization catalyst selected from the group consisting of an N,N',N''-trialkylaminoalkylhexahydrotriazine, a mono(dialkylaminoalkyl)phenol, a 2,4,6-tri(dialkylaminoalkyl)phenol and mixtures thereof, from about 0.03 mole to 0.15 mole per mole of polyisocyanate, of a catalyst for reaction of an isocyanate and anhydride group selected from the group consisting of water, lead naphthenate, the ferrous complex of 2,4-pentanedione, the ferric complex of 2,4-pentanedione, the manganese complex of 2,4-pentanedione, triethylenediamine and trialkylamines, and from about 0.002 mole to about 0.012 mole, per mole of polyisocyanate of a catalyst for the conversion of isocyanate to carbodiimide groups seelcted from the group consisting of 2-phospholene-1-oxides, 3-phospholene-1-oxides, 2-phospholene-1-sulfides, 3-phospholene-1-sulfides, diazaphospholanes, oxazaphospholanes, diazaphosphorinanes, oxazaphosphorinanes, triarylarsines, the beryllium, aluminum, zirconium, chromium and iron derivatives of acetylacetone, trihydrocarbyl phosphates, and complexes derived from a d-group transition and a π-bonding ligand selected from the group consisting of carbon monoxide, nitric oxide, hydrocarbyl isocyanides, trihydrocarbyl phosphine, trihydrocarbylarsine, trihydrocarbylstibine, and dihydrocarbyl sulfide.

2. A polymer foam according to claim 1 wherein the carbodiimide forming catalyst is a 2-phospholene of the formula:

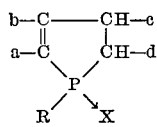

wherein $a$, $b$, $c$, and $d$ are each selected from the group consisting of hydrogen and hydrocarbyl from 1 to 12 carbon atoms, inclusive, R is selected from the group consisting of lower-alkyl and aryl, and X is selected from the class consisting of oxygen and sulfur.

3. A polymer foam according to claim 1 wherein the carbodiimide forming catalyst is 1-phenyl-3-methyl-2-phospholene 1-oxide.

4. A polymer foam according to claim 1 wherein the trimerization catalyst is N,N',N"-(dimethylaminopropyl)-s-hexahydrotriazine.

5. A polymer foam according to claim 1 wherein the catalyst for reaction of isocyanate and anhydride groups is triethylenediamine.

6. A polymer foam according to claim 1 wherein from about 0.02 equivalent to about 0.1 equivalent, per equivalent of polyisocyanate of a lower alkanol is also present in the foam-forming reaction.

7. A polymer foam characterized by high resistance to deformation by heat, low friability, and by the presence of isocyanurate moieties, carbodiimide moieties and moieties selected from the class consisting of amide and imide, said foam being the product of reaction at ambient temperatures, in the presence of a blowing agent of:

(a) a polymethylene polyphenyl polyisocyanate;
(b) from about 0.06 equivalent to about 0.6 equivalent, per equivalent of polyisocyanate of a polycarboxylic acid derivative containing at least two carboxylic moieties selected from the class consisting of free carboxylic acid groups and anhydride groups;
(c) from about 0.01 to about 0.05 mole per mole of polyisocyanate of an N,N',N"-trialkylaminoalkyl-s-hexahydrotriazine;
(d) from about 0.01 mole to about 0.05 mole, per mole of polyisocyanate, of triethylenediamine;
(e) from about 0.01 mole to about 0.3 mole, per mole of polyisocyanate, of a homocyclic polyepoxide; and
(f) from about 0.002 to about 0.012 mole, per mole of polyisocyanate, of a 2-phospholene selected from the class consisting of 1-aryl-3-lower-alkyl-2-phospholene-1-oxides and 1,3-di(lower-alkyl)-2-phospholene-1-oxides.

8. A polymer foam according to claim 7 wherein the trimerization catalyst is N,N',N"-(dimethylaminopropyl)-s-hexahydrotriazine.

9. A polymer foam according to claim 8 wherein the 2-phospholene is 1-phenyl-3-methyl - 2 - phospholene-1-oxide.

10. A polymer foam according to claim 9 wherein the homocyclic polyepoxide is an epoxy novolac resin.

11. A polymer foam according to claim 10 wherein the polycarboxylic acid derivative is 3,3',4,4'-benzophenone tetracarboxylic acid dianhydride.

References Cited

UNITED STATES PATENTS

| | | | |
|---|---|---|---|
| 3,620,986 | 11/1971 | Diehr | 260—2.5 AC |
| 3,620,987 | 11/1971 | McLaughlin | 202—2.5 A |
| 3,580,868 | 5/1971 | Diehr | 260—2.5 AC |
| 3,562,189 | 2/1971 | Farrissey | 260—2.5 A |
| 3,426,025 | 2/1969 | Smeltz | 260—551 X |
| 3,406,198 | 10/1968 | Budnick | 260—551 |
| 3,406,197 | 10/1968 | Ulrich | 260—551 |
| 2,941,966 | 6/1960 | Campbell | 260—551 X |
| 3,657,161 | 4/1972 | Bernard | 260—2.5 AW |
| 3,645,923 | 2/1972 | Kan | 260—2.5 AW |
| 3,644,234 | 2/1972 | Grieve | 260—47 CB |
| 3,640,966 | 2/1972 | Hennig | 260—2.5 BF |

FOREIGN PATENTS

| | | | |
|---|---|---|---|
| 6,815,568 | 5/1969 | Netherlands | 260—2.5 AW |

DONALD E. CZAJA, Primary Examiner

C. W. IVY, Assistant Examiner

U.S. Cl. X.R.

260—2.5 AM, 2.5 AW, 2.5 BF